US012688689B2

(12) United States Patent
Gsellmann et al.

(10) Patent No.: US 12,688,689 B2
(45) Date of Patent: Jul. 21, 2026

(54) METHOD AND APPARATUS FOR RECYCLING FEEDSTOCK IDENTIFICATION

(71) Applicant: Borealis AG, Vienna (AT)

(72) Inventors: Günter Gsellmann, Linz (AT); Anna Hartl, Linz (AT); Stefan Schützeneder, Wildon (AT); Leyla Biktemirova, Zaventem (BE)

(73) Assignee: Borealis AG, Vienna (AT)

( * ) Notice: Subject to any disclaimer, the term of this patent is extended or adjusted under 35 U.S.C. 154(b) by 488 days.

(21) Appl. No.: 18/283,090

(22) PCT Filed: Mar. 23, 2022

(86) PCT No.: PCT/EP2022/057645
§ 371 (c)(1),
(2) Date: Sep. 20, 2023

(87) PCT Pub. No.: WO2022/200437
PCT Pub. Date: Sep. 29, 2022

(65) Prior Publication Data
US 2024/0312201 A1 Sep. 19, 2024

(30) Foreign Application Priority Data
Mar. 26, 2021 (EP) ..................................... 21165332

(51) Int. Cl.
*G06K 9/00* (2022.01)
*G06V 10/98* (2022.01)
(Continued)

(52) U.S. Cl.
CPC ............ *G06V 10/993* (2022.01); *G06V 20/64* (2022.01); *G06V 20/70* (2022.01)

(58) Field of Classification Search
CPC ...... G06V 10/993; G06V 20/64; G06V 20/70; Y02W 90/00; G06Q 10/06395;
(Continued)

(56) References Cited

U.S. PATENT DOCUMENTS 12,194,505 B2 * 1/2025 Tuerkoglu ............. G06Q 10/30
2014/0202268 A1 7/2014 Lutgendorf
(Continued)

FOREIGN PATENT DOCUMENTS

EP 3705197 A1 * 9/2020 ............. G06Q 10/30
JP 2000338046 A 12/2000
(Continued)

OTHER PUBLICATIONS

Notice of Reasons for Rejection with English translation for Japanese Patent Application No. 2023-558120 dated Jul. 23, 2024, 6 pages.
(Continued)

*Primary Examiner* — Xin Jia
(74) *Attorney, Agent, or Firm* — Lowenstein Sandler LLP

(57) ABSTRACT

The present invention is related to a method for recycling feedstock identification, the method comprising the steps of: Identifying (SI) a delivery portion of a recycling feedstock by providing at least one delivery identifier for delivery identification; Recording (S2) at least one image of at least one portion of the delivery portion of the recycling feedstock; Annotating (S3) at least one data identifier on the recorded at least one image, the data identifier identifying an impurity of the at least one portion of the delivery portion of the recycling feedstock; Evaluating (S4) a quality level of the at least one portion of the delivery portion of the recycling feedstock based on the recorded at least one image and the at least one annotated data identifier; and Deciding (S5) an acceptance of the delivery portion of the recycling
(Continued)

feedstock based on the evaluated quality level of the at least one portion of the delivery portion of the recycling feedstock.

17 Claims, 3 Drawing Sheets

(51) Int. Cl.
  *G06V 20/64* (2022.01)
  *G06V 20/70* (2022.01)
(58) Field of Classification Search
  CPC .... G06Q 10/30; G06Q 10/0833; G06F 21/45;
  G06K 19/06028
  See application file for complete search history.

(56) References Cited

U.S. PATENT DOCUMENTS

| | | | |
|---|---|---|---|
| 2018/0243800 A1 | 8/2018 | Kumar | |
| 2022/0101277 A1* | 3/2022 | Banatao | G06Q 10/30 |

FOREIGN PATENT DOCUMENTS

| | | | |
|---|---|---|---|
| JP | 2003094024 A | 4/2003 | |
| JP | 2014526674 A | 10/2014 | |
| JP | 2016035727 A | 3/2016 | |
| WO | WO-2007112577 A1 * | 10/2007 | .............. B09B 3/35 |

OTHER PUBLICATIONS

European Search Report for European Patent Application No. 21165332.4 dated Oct. 4, 2021, 8 pages.
International Search Report and Written Opinion for PCT/EP2022/057645 mailed Jun. 28, 2022, 14 pages.
Wang, Lihui, et al. "A cloud-based approach for WEEE remanufacturing" CIRP annals (2014) CIRP annals 2014; pp. 409-412.
Dewulf, Victor. Application of machine learning to waste management: identification and classification of recyclables; Technical Report (2017) Technical Report 2017; pp. i-iv and 1-75.
Office Action with English translation for Taiwan Patent Application No. 111111099, dated Dec. 9, 2022, 54 pages.

* cited by examiner

METHOD AND APPARATUS FOR RECYCLING FEEDSTOCK IDENTIFICATION

CROSS-REFERENCE TO RELATED APPLICATION(S)

The present application is a national stage entry under 35 U.S.C. § 371 of International Application No. PCT/EP2022/ 057645, filed on Mar. 23, 2022, which claims priority to European Patent Application No. 21165332.4, filed on Mar. 26, 2021. The contents of these applications are hereby incorporated by reference in their entirety.

FIELD OF THE INVENTION

The present invention relates to a recycling feedstock identification method and apparatus for recycling feedstock identification and in particular to a tool-based recycling feedstock identification method and apparatus for ingoing quality control.

BACKGROUND OF THE INVENTION

In the industry, e.g. in recycling industry or the chemical industry, quality control, QC, engineers at recycling facilities are informed about new deliveries in that the relevant information is copied manually to an electronic data sheet. The QC engineer proceeds on the evaluation on the field by taking handwritten notes and pictures with a camera. Back in the office, the evaluated data is copied manually into the already mentioned electronic sheet. The final report is generated, printed out and stored offline in a cabinet. All relevant pictures are manually moved to a folder.

This leads to the problem that the manually performed entry of data in large electronic sheets is a time consuming and fault-prone—wrong delivery or typos—procedure of the ingoing feedstock QC.

As the evaluation is stored locally and most of the entries are free fields, instead of pre-defined categories, the data is not further processable. Proper statistical evaluation and visualisations of historical data is not or only with high, additional effort possible.

A locally stored electronic sheet enables the possibility for unintentional changes or deletion of entries. No option to tag contaminants in the pictures which is needed to existing contaminants for discussion with supplier and will allow training set for future image recognition.

SUMMARY OF THE INVENTION

The foregoing and other objects are solved by the subject-matter of the present invention as defined by the independent claims. Further embodiments are defined by the dependent claims.

According to a first aspect of the present invention, a method is provided, a recycling feedstock identification method in terms of a tool-based recycling feedstock identification method for ingoing quality control.

The method for recycling feedstock identification comprises the steps of: Identifying a delivery portion of a recycling feedstock by providing at least one delivery identifier for delivery identification; Recording at least one image of at least one portion of the delivery portion of the recycling feedstock; Annotating at least one data identifier on the recorded at least one image, the data identifier identifying an impurity of the at least one portion of the delivery portion of the recycling feedstock; Evaluating a quality level of the at least one portion of the delivery portion of the recycling feedstock based on the recorded at least one image and the at least one annotated data identifier; and Deciding an acceptance of the delivery portion of the recycling feedstock based on the evaluated quality level of the at least one portion of the delivery portion of the recycling feedstock.

Thus, differentiation between portions of different deliveries is possible.

In other words, the present invention advantageously provides as differences compared to prior art an improvement towards time saving and easy life of production engineers for ingoing QC. Further, the present invention advantageously allows by electronic data processing a direct connection to any Enterprise-Resource-Planning, ERP system as well as a direct connection to any Production Planning and Management System, PPS System.

Further, the present invention advantageously allows to avoid evaluation of wrong deliveries.

Further, in an exemplary embodiment, the present invention advantageously provides an improvement towards scanning of barcode data to start the evaluation process and a labelling of impurities in picture, by means of annotated identifiers, which is a pre-work for possible deep learning.

Moreover, the present invention advantageously provides an improvement towards pre-defined categories in the evaluation process as well as dashboard functionality on delivery companies and QC evaluation results. Further, the present invention advantageously allows to avoid typos and the present invention advantageously enables easy post processing for the delivery process.

In other words, the present invention advantageously provides direct decision support for (supplier) management and price negotiations and a prerequisite for Feedstock-Process-Property relation. Implementing an in-house solution, the present invention advantageously provides the possibility of applying AI to assist/automate QC ingoing control, and better documentation and proof of rejected material.

Moreover, the present invention advantageously provides improved data transmission and reduced energy consumption as material quality is in real time monitored and analysed.

According to one exemplary embodiment of the present invention, the data identifier further specifies a specification and/or an impurity level of the at least one portion of the delivery portion of the recycling feedstock per delivery.

According to one embodiment of the present invention, the annotating the at least one data identifier on the recorded at least one image comprises labelling the recorded at least one image with the at least one annotated data identifier resulting in at least one enhanced image with computer-generated perceptual information According to one exemplary embodiment of the present invention, the method further comprises the steps of: performing a login process at a tablet using Multi-factor authentication, MFA, to start a Multi-user environment, wherein the at least one data identifier and the recorded at least one image are mapped to a specific user of the started Multi-user environment.

According to one exemplary embodiment of the present invention, the method further comprises the steps of mapping measured quality levels of multiple portions of the delivery portion of the recycling feedstock to the evaluated quality level of the recycling material; and/or performing machine learning by building a model based on the measured quality levels of multiple portions of the delivery portion of the recycling feedstock and the evaluated quality level of the recycling material to improve the evaluation of the quality level of the recycling material.

In other words, a deep learning model may be based on labelled pictures depicting on the multiple portions of the delivery portion of the recycling feedstock and the measured quality levels and the evaluated quality level are aligned based on the applied deep learning model.

According to one exemplary embodiment of the present invention, the method further comprises the steps of scanning a bar code tagged to the recycling material, the bar code providing the at least one delivery identifier for delivery identification.

According to one exemplary embodiment of the present invention, the method further comprises the steps of evaluating the quality level of the at least one portion of the delivery portion of the recycling feedstock based on the recorded at least one image and the at least one annotated data identifier and the delivery identifier for delivery identification.

According to one exemplary embodiment of the present invention, the method further comprises the steps of generating input data providing at least one parameter of the recycling material.

According to one exemplary embodiment of the present invention, the method further comprises the steps of evaluating the quality level of the at least one portion of the delivery portion of the recycling feedstock based on the recorded at least one image and the at least one annotated data identifier and the at least one parameter of the recycling material.

According to one exemplary embodiment of the present invention, the input data is generated by user input.

According to a second aspect of the present invention, a computer program product is provided comprising computer-readable instructions which, when loaded and executed on processor, performs the method according to any one of the embodiments of the first aspect or the first aspect as such.

According to a third aspect of the present invention, an apparatus is provided, the apparatus configured for recycling feedstock identification, the apparatus comprising an image sensor which is configured to identify a delivery portion of a recycling feedstock by providing at least one delivery identifier for delivery identification and to record at least one image of at least one portion of the delivery portion of the recycling feedstock.

The apparatus further comprising a processor, which is configured to annotate at least one data identifier on the recorded at least one image, the data identifier identifying an impurity of the at least one portion of the delivery portion of the recycling feedstock; and the processor further configured to evaluate a quality level of the at least one portion of the delivery portion of the recycling feedstock based on the recorded at least one image and the at least one annotated data identifier, and to decide an acceptance of the delivery portion of the recycling feedstock based on the evaluated quality level of the at least one portion of the delivery portion of the recycling feedstock.

According to one embodiment of the present invention, the data identifier further specifies a specification and/or an impurity level of the at least one portion of the delivery portion of the recycling feedstock per delivery.

According to one embodiment of the present invention, the annotating the at least one data identifier on the recorded at least one image comprises labelling the recorded at least one image with the at least one annotated data identifier resulting in at least one enhanced image with computer-generated perceptual information According to one embodiment of the present invention, the processor is further configured to perform a login process at a tablet using Multi-factor authentication, MFA, to start a Multi-user environment, wherein the at least one data identifier and the recorded at least one image are mapped to a specific user of the Multi-user environment.

According to one embodiment of the present invention, the processor is further configured to map measured quality levels of multiple portions of the recycling material to the evaluated quality level of the recycling material; wherein the processor is further configured to perform machine learning building a model based on the measured quality levels of multiple portions of the delivery portion of the recycling feedstock and the evaluated quality level of the recycling material to improve the evaluation of the quality level of the recycling material. In other words, a deep learning model may be based on labelled pictures depicting the multiple portions of the delivery portion of the recycling feedstock. The measured quality levels and the evaluated quality level are aligned based on the applied deep learning model.

According to one embodiment of the present invention, the image sensor and the processor are further configured to scan a bar code tagged to the recycling material, the bar code providing the at least one delivery identifier for delivery identification; and wherein the processor is further configured to evaluate the quality level of the at least one portion of the delivery portion of the recycling feedstock based on the recorded at least one image and the at least one annotated data identifier and the delivery identifier for delivery identification.

According to one embodiment of the present invention, the processor is further configured to generate input data providing at least one parameter of the recycling material.

According to one embodiment of the present invention, the processor is further configured to evaluate the quality level of the recycling material based on the recorded at least one image and the at least one annotated data identifier and the at least one parameter of the recycling material.

According to one embodiment of the present invention, the processor is further configured that input data is generated by user input.

According to a further aspect of the present invention, a computer program data structure is provided comprising image data in terms of at least one recorded image of at least one portion of recycling material and at least one annotated data identifier on the recorded at least one image, the data identifier identifying an impurity of the at least one portion of the recycling feedstock, the at least one recorded image of at least one portion of recycling material and the at least one annotated data identifier are used to evaluate a quality level of the recycling material based on the recorded at least one image and the at least one annotated data identifier.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) and an EPROM (Erasable Programmable Read Only Memory).

A computer-readable medium may also be a data communication network, for example the Internet, which allows downloading a program code, with a connection via WLAN or 3G/4G or any other wireless data technology.

The methods, systems and devices described herein may be implemented as software in a Digital Signal Processor, DSP, in a micro-controller or in any other side-processor or as hardware circuit within an application specific integrated circuit, ASIC, CPLD or FPGA.

The present invention can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

A more complete appreciation of the invention and the attendant advantages thereof will be more clearly understood by reference to the following schematic drawings, which are not to scale, wherein.

DETAILED DESCRIPTION OF EMBODIMENTS

Figure 1:
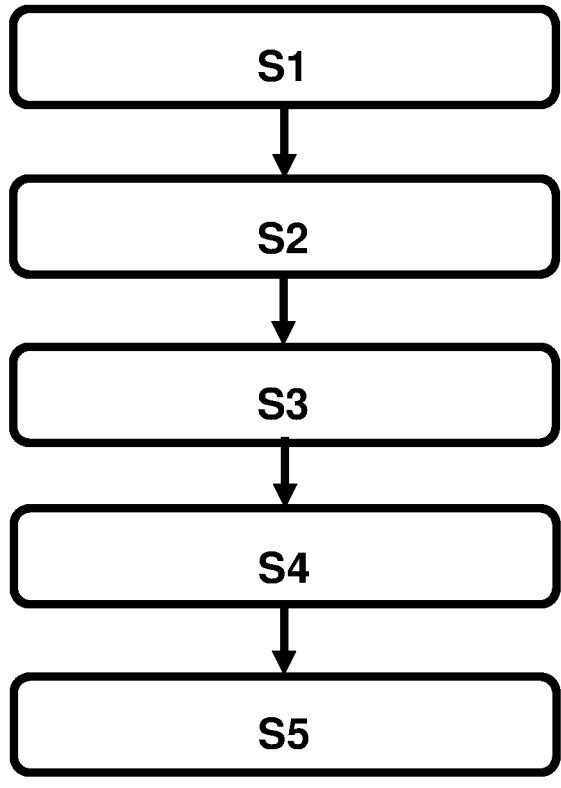
FIG. 1 shows a schematic diagram of a method for recycling feedstock identification according to an exemplary embodiment of the invention.

The illustration in the drawings is schematically and not to scale. In different drawings, similar or identical elements are provided with the same reference numerals.

Generally, identical parts, units, entities or steps are provided with the same reference symbols in the figures.

FIG. 1 shows a schematic diagram of a method for recycling feedstock identification according to an exemplary embodiment of the invention.

In particular, FIG. 1 shows a method for recycling feedstock identification, the method comprising the following steps.

As a first step of the method, identifying S1 a delivery portion of a recycling feedstock by providing at least one delivery identifier for delivery identification 1 is conducted.

As a second step of the method, recording S2 at least one image of at least one portion of the delivery portion of the recycling feedstock is performed.

As a third step of the method, annotating S3 at least one data identifier on the recorded at least one image, the data identifier identifying an impurity of the at least one portion of the delivery portion of the recycling feedstock is performed.

As a fourth step of the method, evaluating S4 a quality level of the at least one portion of the delivery portion of the recycling feedstock based on the recorded at least one image and the at least one annotated data identifier is performed.

As a fifth step of the method, deciding S5 an acceptance of the delivery portion of the recycling feedstock based on the evaluated quality level of the at least one portion of the delivery portion of the recycling feedstock is conducted.

The acceptance of the complete delivery may be completely accepted, or partially accepted or partially or completely disapproved.

The term "impurity" as used by the description of the present invention may comprise an impurity or a visual abnormality, a visual indication of component or additive that renders something else impure or a visual indication of a homogeneous or heterogeneous mixture.

Figure 2:
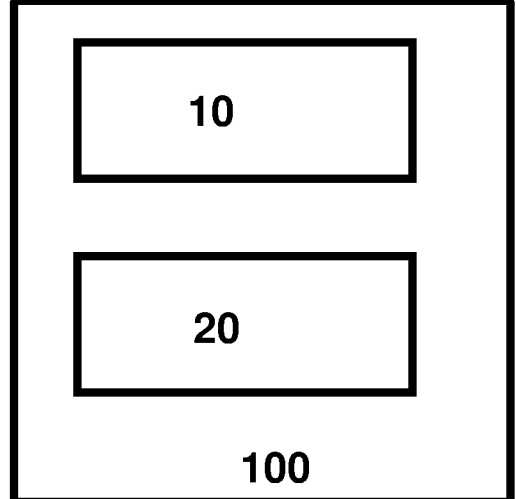
FIG. 2 shows a schematic diagram of an apparatus for recycling feedstock identification according to an exemplary embodiment of the invention.

FIG. 2 shows a schematic diagram of an apparatus for recycling feedstock identification according to an exemplary embodiment of the invention.

An apparatus 100 for recycling feedstock identification is provided, the apparatus 100 comprises an image sensor 10 which is configured to identify a delivery portion of a recycling feedstock by providing at least one delivery identifier for delivery identification and to record at least one image of at least one portion of the delivery portion of the recycling feedstock.

Further, the apparatus 100 comprises a processor 20, which is configured to annotate at least one data identifier on the recorded at least one image, the data identifier identifying an impurity of the at least one portion of the delivery portion of the recycling feedstock; and the processor further configured to evaluate a quality level of the at least one portion of the delivery portion of the recycling feedstock based on the recorded at least one image and the at least one annotated data identifier, and to decide an acceptance of the delivery portion of the recycling feedstock based on the evaluated quality level of the at least one portion of the delivery portion of the recycling feedstock.

The image sensor 10 may be implemented in a tablet, in a terminal or in a mobile phone. The term "tablet" as used by the description of the present invention may comprise a tablet computer in terms of a mobile device, typically with a mobile computer configured to be operated by an operating system.

The image sensor 10 may be implemented as an image sensor which detects and conveys information used to make an image to record at least one image of at least one portion of recycling material. The image sensor 10 may be implemented as an image sensor by converting light wave information into signals, small bursts of current that convey the information. The waves can be light or other electromagnetic radiation.

The processor 20 is further configured to evaluate a quality level of the recycling material based on the recorded at least one image and the at least one annotated data identifier.

The processor 20 may be implemented as Digital Signal Processor, DSP, in a micro-controller or in any other side-processor or as hardware circuit within an application specific integrated circuit, ASIC, CPLD or FPGA.

The processor 20 may be implemented as a Field Programmable Gate Arrays in terms of an integrated circuit that contains large numbers of identical logic cells.

According to an exemplary embodiment of the invention, the apparatus for recycling feedstock identification may run as an application program on a tablet to facilitate and digitize feedstock intake quality control or the apparatus for recycling feedstock identification may be implemented as a desktop computer with the method as a desktop program version to provide transparent and structured data for supplier management.

According to an exemplary embodiment of the invention a system for recycling feedstock identification is provided, wherein the system comprises a tablet with the apparatus.

According to an exemplary embodiment of the invention the system further comprises a data base configured to map measured quality levels of multiple portions of the recycling material to the evaluated quality level of the recycling material.

According to an exemplary embodiment of the invention, the apparatus is configured to provide a notification to a quality control engineer about a new delivery. According to an exemplary embodiment of the invention, the apparatus is configured to perform two ways to start the evaluation, for example by scanning the barcode or by choosing the delivery.

According to an exemplary embodiment of the invention, the apparatus is configured to perform an automated identification of the delivery, preferably the apparatus is configured to crosscheck by recording images of the recycling material and annotating the impurities resulting in labelled pictures.

According to an exemplary embodiment of the invention, the apparatus is configured to provide a bales specification to user for an acceptance or rejections of single delivery portions or bales of recycling material.

According to an exemplary embodiment of the invention, the apparatus is configured to provide a definition of specification of the recycling material, for example via an impurity range, bales transparency, or an amount of visible black films or other impurities of the recycling material.

According to an exemplary embodiment of the invention the system further comprises a cloud structure configured to perform machine learning by building a model based on the measured quality levels of multiple portions of the recycling material and the evaluated quality level of the recycling material to improve the evaluation of the quality level of the recycling material.

According to an exemplary embodiment of the invention, the machine learning model further uses a model based on a type of material of the recycling material and the evaluated quality level of the recycling material to improve the evaluation of the quality level of the recycling material.

According to an exemplary embodiment of the invention the machine learning model further uses a model based on a type of material of a contaminant or impurity of the recycling material and the evaluated quality level of the recycling material to improve the evaluation of the quality level of the recycling material.

According to an exemplary embodiment of the invention, the machine learning model is a hybrid model based on using the recorded at least one image, the at least one annotated data identifier, or the type of material of the recycling material or categorical quality measurements provided by the QC engineer (like amount of different impurities)

According to an exemplary embodiment of the invention, the machine learning model is implemented as an artificial neural network.

According to an exemplary embodiment of the invention, the machine learning model is implemented as neural network model, machine learning model, deep learning model, regression model or other such cognitive or artificial intelligence for performing a cognitive operation.

Figure 3:
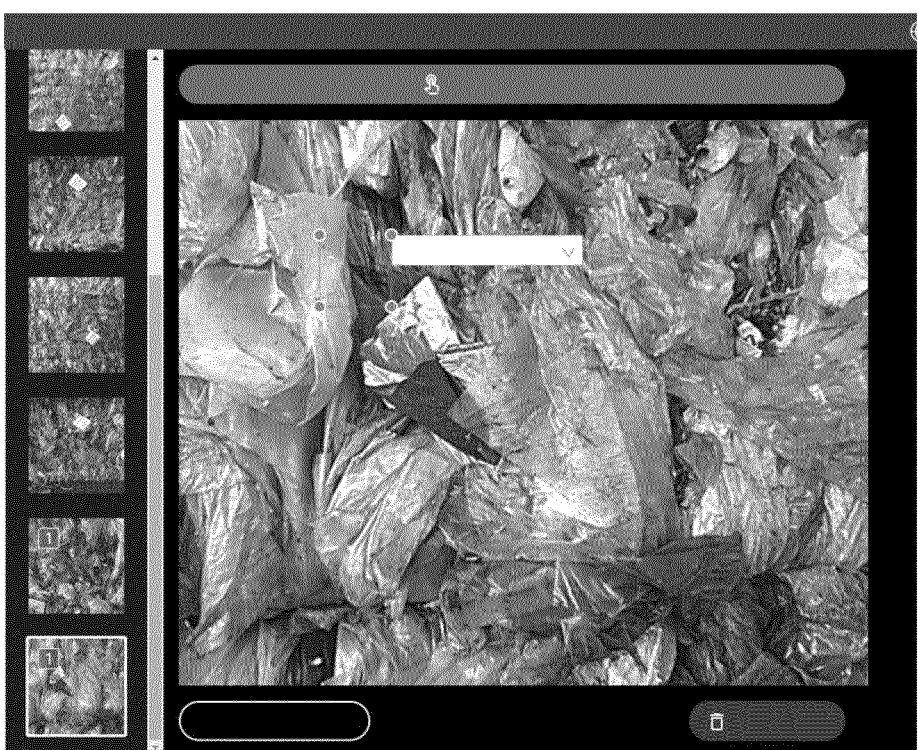
FIG. 3 shows a schematic diagram of a recorded image with annotated identifier for recycling feedstock identification according to an exemplary embodiment of the invention.

FIG. 3 shows a schematic diagram of a recorded image with annotated identifier for recycling feedstock identification according to an exemplary embodiment of the invention.

According to an exemplary embodiment of the invention, the present invention may be implemented in two different computer program applications, a tablet app and a desktop version. The computer program application, or in short app, is used by QC engineers to evaluate the ingoing feedstock:

According to an exemplary embodiment of the invention, an individual login process at tablet with *Borealis* credential with Multi-factor authentication (MFA) may be used.

According to an exemplary embodiment of the invention, once logged in a starting page with the delivery overview is displayed and offers different further actions according to an exemplary embodiment of the invention:

Logout from account and change language

Scan the bar code to start the evaluation process

Filter the overview on status and sort it by date

Expand the line to see more details

Start the evaluation of particular delivery by clicking on 'Analyse bales' button Skip the evaluation by clicking on 'Skip analysis' button According to an exemplary embodiment of the invention, in the case of evaluation process, the next step is taking pictures and annotate impurities:

See delivery details on the left side bar

Take multiple pictures and delete them

Indicate impurities and delete them

Mark picture as 'Rejected'

Go to the following step by clicking 'Next'

Leave the process now. This delivery will get 'In process' status and can be continued again at any moment.

According to an exemplary embodiment of the invention, once pictures are taken and annotated, the indication of different specifications and level of impurities is next:

See delivery details on the left side bar

See the album with the pictures and can enlarge them by clicking on the thumbnails See two tabs: Accepted and Rejected Indicate the value of specs by scrolling Indicate level of impurities or deselect them Go to the following step by clicking 'Next'

Leave the process now. This delivery will get 'In process' status and can be continued again at any moment.

According to an exemplary embodiment of the invention, the last step is the final evaluation of the quality:

See summary of your evaluation

See right side bar to assess delivery overall

Indicate the acceptance of the bales

Score the quality of the delivery

Generate the protocol by clicking on the button

Leave the process now. This delivery will get 'In process' status and can be continued again at any moment.

According to an exemplary embodiment of the invention, the desktop version will serve as an overview and management tool on all ingoing feedstock relevant topics for a broader audience such as feedstock procurement, operations and quality control. This offers as well the possibility to perform the QC evaluation. It may comprise two different tabs:

At first a "Delivery overview":

Logout from your account and Change language

Filter the overview on status, date and umbrella organization

Sort the overview by date

Search for particular delivery

Expand the line to see more details

Download the protocol and pictures of the evaluated delivery

Skip the evaluation by clicking on 'Skip analysis' button

Second, a "Dashboard":

Logout from your account and Change language

Figure 4:
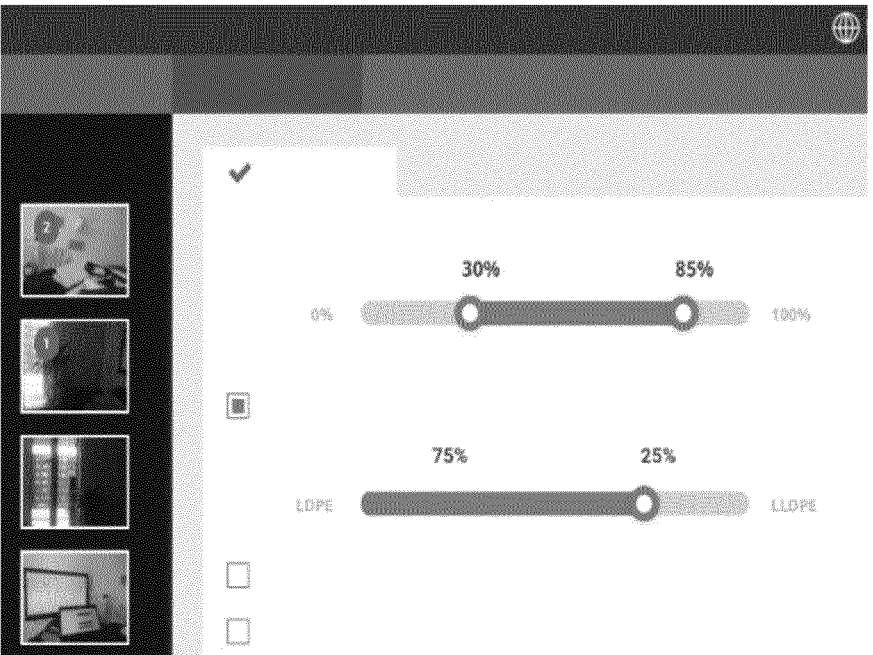
FIG. 4 shows a schematic diagram of a user input system according to an exemplary embodiment of the invention.

Visualize overall Quality indication, Impurity levels, seasonal influence, split on umbrella organization or sorting companies Download relevant data or visualizations Filter the graphs on specification, umbrella organization, sorting companies, overall quality score and time frame FIG. 4 shows a schematic diagram of a user input system according to an exemplary embodiment of the invention.

Figure 5:
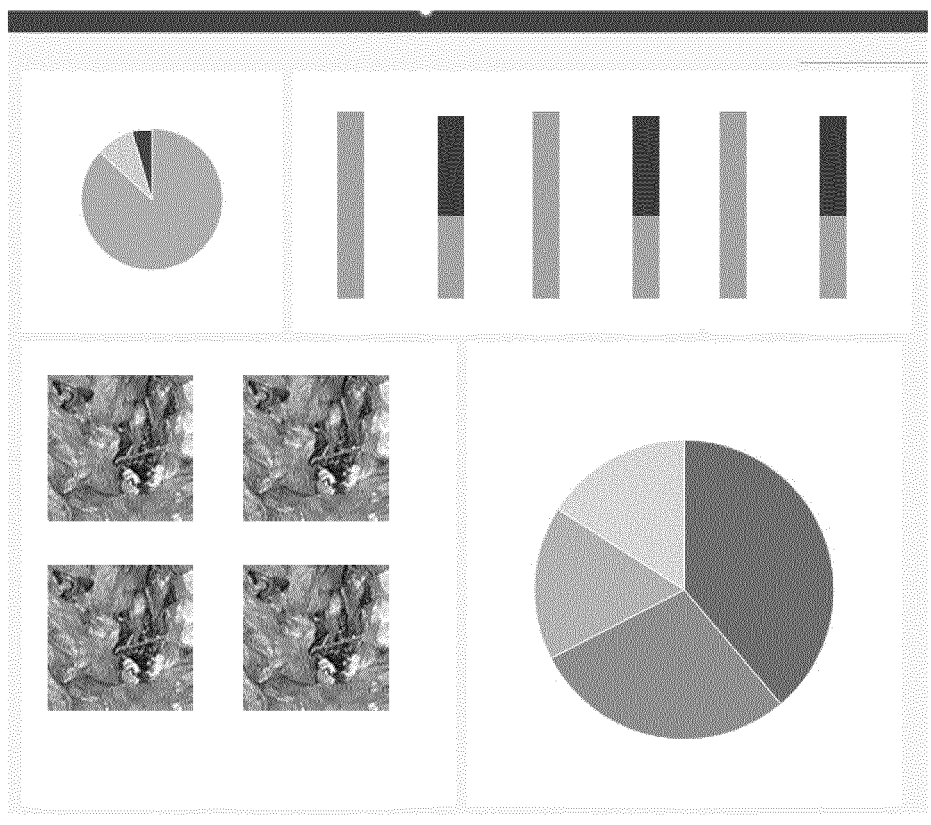
FIG. 5 shows a schematic diagram of a dashboard according to an exemplary embodiment of the invention.

FIG. 5 shows a schematic diagram of a dashboard according to an exemplary embodiment of the invention.

According to an exemplary embodiment of the invention, the method for recycling feedstock identification comprises the following step:

Performing a search on the evaluated quality level of the at least one portion of the delivery portion of the recycling feedstock for past deliveries.

According to an exemplary embodiment of the invention, the method for recycling feedstock identification comprises the following step: downloading of QC protocols and recorded images for past deliveries.

According to an exemplary embodiment of the invention, the method for recycling feedstock identification comprises a management tool on all ingoing feedstock relevant topics.

According to an exemplary embodiment of the invention, the method for recycling feedstock identification comprises using a dashboard indicating EPR shares, feedstock quality and price.

According to a further exemplary embodiment of the present invention, a data carrier or a data storage medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for recycling feedstock identification, the method comprising:

Identifying a delivery portion of a recycling feedstock by providing at least one delivery identifier for delivery identification;

Recording at least one image of at least one portion of the delivery portion of the recycling feedstock;

Annotating at least one data identifier on the recorded at least one image, the data identifier identifying an impurity of the at least one portion of the delivery portion of the recycling feedstock;

Evaluating a quality level of the at least one portion of the delivery portion of the recycling feedstock based on the recorded at least one image and the at least one annotated data identifier; and Deciding an acceptance of the delivery portion of the recycling feedstock based on the evaluated quality level of the at least one portion of the delivery portion of the recycling feedstock.

2. The method according to claim 1, wherein the data identifier further specifies a specification and/or an impurity level of the at least one portion of the delivery portion of the recycling feedstock per delivery.

3. The method according to claim 2, wherein the annotating the at least one data identifier on the recorded at least one image comprises labelling the recorded at least one image with the at least one annotated data identifier resulting in at least one enhanced image with computer-generated perceptual information.

4. The method according to claim 1, wherein the method further comprises:

performing a login process at a tablet using Multi-factor authentication, MFA, to start a Multi-user environment, wherein the at least one data identifier and the recorded at least one image are mapped to a specific user of the started Multi-user environment.

5. The method according claim 1, wherein the method further comprises:

mapping measured quality levels of multiple portions of the delivery portion of the recycling feedstock to the evaluated quality level of the recycling material; and/or performing machine learning by building a model based on the measured quality levels of multiple portions of the delivery portion of the recycling feedstock and the evaluated quality level of the recycling material to improve the evaluation of the quality level of the recycling material.

6. The method according to claim 1, wherein the method further comprises:

scanning a bar code tagged to the recycling material, the bar code providing the at least one delivery identifier for delivery identification; and evaluating the quality level of the at least one portion of the delivery portion of the recycling feedstock based on the recorded at least one image and the at least one annotated data identifier and the delivery identifier for delivery identification.

7. The method according to claim 1, wherein the method further comprises:

generating input data providing at least one parameter of the recycling material; and evaluating the quality level of the at least one portion of the delivery portion of the recycling feedstock based on the recorded at least one image and the at least one annotated data identifier and the at least one parameter of the recycling material.

8. The method according to claim 7, wherein the input data is generated by user input.

9. A computer-readable medium comprising instructions which, when executed by a computer, cause the computer to carry out the steps of the method of claim 1.

10. An apparatus for recycling feedstock identification, the apparatus comprising:

an image sensor which is configured to identify a delivery portion of a recycling feedstock by providing at least one delivery identifier for delivery identification and to record at least one image of at least one portion of the delivery portion of the recycling feedstock; and a processor, which is configured to annotate at least one data identifier on the recorded at least one image, the data identifier identifying an impurity of the at least one portion of the delivery portion of the recycling feedstock; and the processor further configured to evaluate a quality level of the at least one portion of the delivery portion of the recycling feedstock based on the recorded at least one image and the at least one annotated data identifier, and to decide an acceptance of the delivery portion of the recycling feedstock based on the evaluated quality level of the at least one portion of the delivery portion of the recycling feedstock.

11. The apparatus according to claim 10, wherein the data identifier further specifies a specification and/or an impurity level of the at least one portion of the recycling material per delivery.

12. The apparatus according to claim 10, wherein the processor is further configured to perform a login process at a tablet using Multi-factor authentication, MFA, to start a Multi-user environment, wherein the at least one data identifier and the recorded at least one image are mapped to a specific user of the Multi-user environment.

13. The apparatus according to claim 10, wherein the processor is further configured to map measured quality levels of multiple portions of the delivery portion of the recycling feedstock to the evaluated quality level of the recycling material; and wherein the processor is further configured to perform machine learning building a model based on the measured quality levels of multiple portions of the delivery portion of the recycling feedstock and the evaluated quality level of the recycling material to improve the evaluation of the quality level of the recycling material.

14. The apparatus according to claim 10, wherein the image sensor and the processor are further configured to scan a bar code tagged to the recycling material, the bar code providing the at least one delivery identifier for delivery identification; and wherein the processor is further configured to evaluate the quality level of the at least one portion of the delivery portion of the recycling feedstock based on the recorded at least one image and the at least one annotated data identifier and the delivery identifier for delivery identification.

15. The apparatus according to claim 10, wherein the processor is further configured to generate input data providing at least one parameter of the recycling material; and wherein the processor is further configured to evaluate the quality level of the at least one portion of the delivery portion of the recycling feedstock based on the recorded at least one image and the at least one annotated data identifier and the at least one parameter of the recycling material.

16. The apparatus according to claim 15, wherein the input data is generated by user input.

17. A system for recycling feedstock identification, the system comprising a tablet with the apparatus according to claim 10 wherein the system further comprises:

a data base configured to map measured quality levels of multiple portions of the recycling material to the evaluated quality level of the recycling material a cloud structure configured to perform machine learning by building a model based on the measured quality levels of multiple portions of the recycling material and the evaluated quality level of the recycling material to improve the evaluation of the quality level of the recycling material.

* * * * *